(12) United States Patent
Bales et al.

(10) Patent No.: US 11,236,619 B2
(45) Date of Patent: Feb. 1, 2022

(54) MULTI-COVER GAS TURBINE ENGINE COMPONENT

(71) Applicant: United Technologies Corporation, Farmington, CT (US)

(72) Inventors: Daniel A. Bales, Avon, CT (US); Michael DuPont, Berlin, CT (US); Eric W. Malmborg, Amston, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 131 days.

(21) Appl. No.: 16/404,774

(22) Filed: May 7, 2019

(65) Prior Publication Data
US 2020/0355080 A1 Nov. 12, 2020

(51) Int. Cl.
| | | |
|---|---|---|
| *B23K 1/00* | (2006.01) | |
| *F01D 5/00* | (2006.01) | |
| *F01D 5/18* | (2006.01) | |
| *B23K 101/00* | (2006.01) | |

(52) U.S. Cl.
CPC ............. *F01D 5/184* (2013.01); *F01D 5/187* (2013.01); *B23K 2101/001* (2018.08); *F05D 2220/36* (2013.01); *F05D 2240/30* (2013.01)

(58) Field of Classification Search
None
See application file for complete search history.

(56) References Cited

U.S. PATENT DOCUMENTS

| | | |
|---|---|---|
| 2,675,208 A | 4/1954 | Weinberg |
| 4,188,811 A | 2/1980 | Brimm |
| 5,063,662 A | 11/1991 | Porter et al. |
| (Continued) | | |

FOREIGN PATENT DOCUMENTS

| | | |
|---|---|---|
| CN | 101418811 | 4/2009 |
| DE | 102011076082 | 11/2012 |
| (Continued) | | |

OTHER PUBLICATIONS

International Preliminary Report on Patentability for International Application No. PCT/US2020/031835 dated Nov. 18, 2021.

*Primary Examiner* — Devang R Patel
(74) *Attorney, Agent, or Firm* — Carlson, Gaskey & Olds, P.C.

(57) ABSTRACT

An airfoil for a gas turbine engine according to an example of the present disclosure includes, among other things, an airfoil body extending between leading and trailing edges in a chordwise direction and extending from a root section in a spanwise direction, and the airfoil body defining pressure and suction sides separated in a thickness direction. The airfoil body defines a recessed region extending inwardly from at least one of the pressure and suction sides, and the airfoil body includes one or more ribs that define a plurality of pockets within a perimeter of the recessed region. A plurality of cover skins is welded to the airfoil body along the one or more ribs to enclose respective ones of the plurality of pockets. The plurality of cover skins formed from a common cover having a perimeter that is dimensioned to mate with the perimeter of the recess. A method of forming a gas turbine engine component is also disclosed.

13 Claims, 13 Drawing Sheets

(56) References Cited

U.S. PATENT DOCUMENTS

| | | |
|---|---|---|
| 5,269,058 A | 12/1993 | Wiggs et al. |
| 6,039,542 A | 3/2000 | Schilling et al. |
| 6,994,525 B2* | 2/2006 | Weisse .................. F01D 5/147 |
| | | 416/233 |
| 7,021,899 B2 | 4/2006 | Ferte et al. |
| 7,189,064 B2 | 3/2007 | Helder et al. |
| 7,237,709 B2 | 7/2007 | Beckford |
| 7,296,977 B2 | 11/2007 | Bonnet |
| 7,322,223 B2 | 1/2008 | Levers |
| 7,753,654 B2 | 7/2010 | Read et al. |
| 7,993,105 B2 | 8/2011 | Weisse et al. |
| 8,205,476 B2 | 6/2012 | Voice |
| 8,256,118 B2 | 9/2012 | Cammer |
| 9,010,166 B2 | 4/2015 | Brennand |
| 9,121,287 B2 | 9/2015 | Weisse et al. |
| 9,169,731 B2* | 10/2015 | Hui ....................... F01D 5/282 |
| 9,359,901 B2 | 6/2016 | Evans et al. |
| 9,453,418 B2* | 9/2016 | Hui ....................... F01D 5/147 |
| 9,556,742 B2 | 1/2017 | Parkin et al. |
| 9,657,577 B2 | 5/2017 | Weisse |
| 9,790,800 B2 | 10/2017 | Quigley |
| 2005/0044708 A1 | 3/2005 | Lundgren et al. |
| 2013/0039774 A1 | 2/2013 | Viens et al. |
| 2013/0108470 A1* | 5/2013 | Weisse .................. F01D 5/16 |
| | | 416/97 R |
| 2014/0241897 A1 | 8/2014 | Bales et al. |
| 2014/0271227 A1 | 9/2014 | Radomski et al. |
| 2015/0125308 A1 | 5/2015 | Radomski |
| 2015/0226068 A1 | 8/2015 | Maurizio |
| 2016/0201480 A1* | 7/2016 | Foster ................ B29D 99/0014 |
| | | 415/200 |
| 2016/0265365 A1 | 9/2016 | Crowston |
| 2016/0305443 A1 | 10/2016 | Schwarz et al. |
| 2017/0023009 A1 | 1/2017 | Roche |
| 2018/0318966 A1 | 11/2018 | Evans et al. |
| 2019/0040744 A1 | 2/2019 | Bales et al. |

FOREIGN PATENT DOCUMENTS

| | | |
|---|---|---|
| EP | 2727681 | 5/2014 |
| EP | 3153664 | 4/2017 |
| GB | 2073631 | 10/1981 |
| JP | S6326285 | 2/1988 |

\* cited by examiner

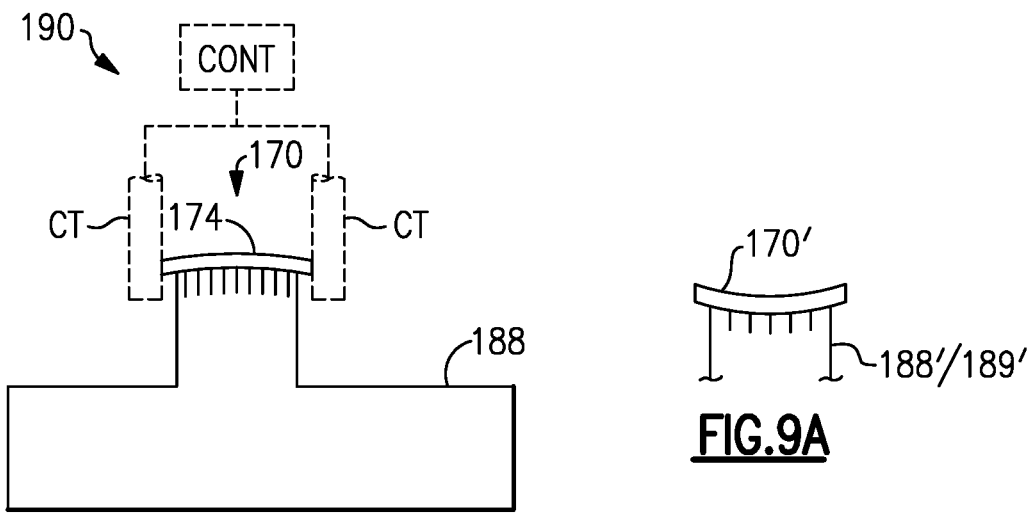
FIG.9
FIG.9A
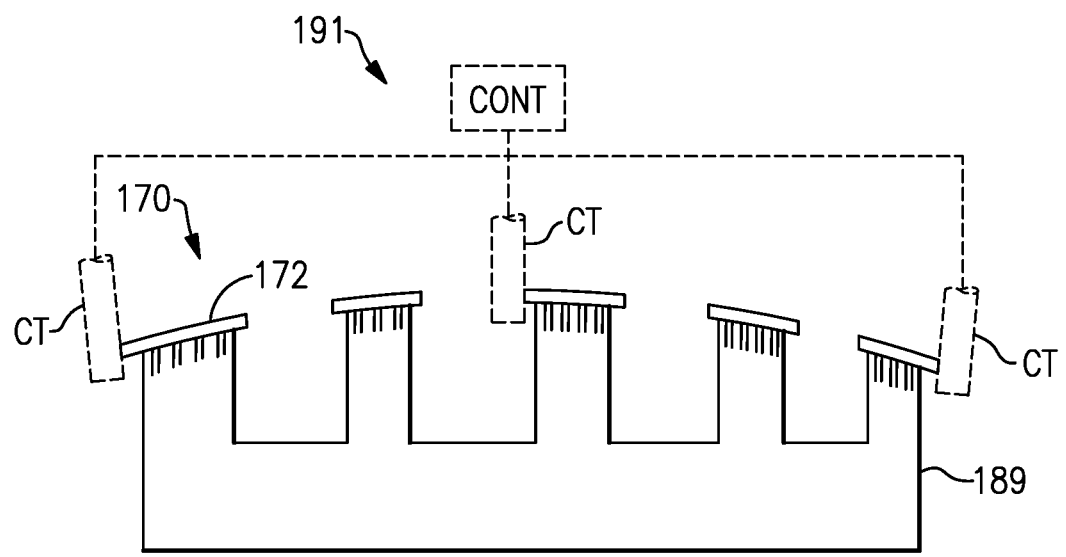
FIG.10

MULTI-COVER GAS TURBINE ENGINE COMPONENT

BACKGROUND

This disclosure relates to a gas turbine engine, and more particularly to hollow gas turbine engine components.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

Some fans include hollow fan blades made of a metallic or composite material. Various techniques can be utilized to construct hollow fan blades, including attaching a cover to an airfoil body.

SUMMARY

An airfoil for a gas turbine engine according to an example of the present disclosure includes an airfoil body extending between leading and trailing edges in a chordwise direction and extending from a root section in a spanwise direction, and the airfoil body defining pressure and suction sides separated in a thickness direction. The airfoil body defines a recessed region extending inwardly from at least one of the pressure and suction sides, and the airfoil body includes one or more ribs that define a plurality of pockets within a perimeter of the recessed region. A plurality of cover skins is welded to the airfoil body along the one or more ribs to enclose respective ones of the plurality of pockets. The plurality of cover skins formed from a common cover having a perimeter that is dimensioned to mate with the perimeter of the recess.

In a further embodiment of any of the foregoing embodiments, the plurality of cover skins are dimensioned to mate with a perimeter of respective ones of the plurality of pockets.

In a further embodiment of any of the foregoing embodiments, the plurality of cover skins includes a peripheral cover skin and one or more localized cover skins. The peripheral cover skin includes the perimeter of the common cover such that the peripheral cover skin surrounds the one or more localized cover skins in an installed position.

In a further embodiment of any of the foregoing embodiments, the peripheral cover skin is welded to the airfoil body along the perimeter of the recessed region.

In a further embodiment of any of the foregoing embodiments, the one or more localized cover skins are a plurality of localized cover skins that are spaced apart from each other and from the perimeter of the recessed region.

In a further embodiment of any of the foregoing embodiments, the plurality of localized cover skins includes a first cover skin. The first cover skin has a plurality of branch segments extending from an elongated body.

In a further embodiment of any of the foregoing embodiments, the one or more ribs include a plurality of ribs, each one of the plurality of ribs including a raised protrusion extending outwardly from a pedestal portion, the pedestal portion dimensioned to support an opposed pair of the plurality of cover skins, and the raised protrusion is dimensioned to extend between and space apart the opposed pair.

In a further embodiment of any of the foregoing embodiments, the airfoil is a fan blade.

A gas turbine engine according to an example of the present disclosure includes a fan section that has a fan rotatable about an engine longitudinal axis, a compressor section, a turbine section that drives the compressor section and the fan, and a plurality of airfoils each including an airfoil body defining a recessed region extending inwardly from a sidewall of the airfoil body. The sidewall includes a plurality of ribs that divide the recessed region into a plurality of pockets. A plurality of cover skins are formed from a common cover that is dimensioned with respect to an external surface contour of the airfoil body. The plurality of cover skins have a peripheral cover skin and a plurality of localized cover skins mechanically attached to the airfoil body along the plurality of ribs to enclose respective ones of the plurality of pockets, and the peripheral cover skin comprise a perimeter of the common cover.

In a further embodiment of any of the foregoing embodiments, the fan comprises the plurality of airfoils.

In a further embodiment of any of the foregoing embodiments, the peripheral cover skin is welded to a perimeter of the recessed region such that the peripheral cover skin surrounds the plurality of localized cover skins in an installed position, and the plurality of localized cover skins are dimensioned to mate with a perimeter of respective ones of the plurality of pockets.

In a further embodiment of any of the foregoing embodiments, each one of the plurality of ribs includes a pedestal portion and a raised protrusion, and the raised protrusion is dimensioned to extend outwardly from the pedestal portion to space apart an opposed pair of the plurality of localized cover skins in the installed position.

A method of forming a gas turbine engine according to an example of the present disclosure includes forming a recessed region in a sidewall of a main body, dividing the recessed region into a plurality of pockets between one or more ribs such that the plurality of pockets are surrounded by a perimeter of the recessed region, contouring a cover according to an external surface contour of the main body such that a perimeter of the cover is dimensioned to mate with the perimeter of the recessed region, dividing the cover to form a plurality of cover skins subsequent to the contouring step, positioning the plurality of cover skins to enclose respective ones of the plurality of pockets, and welding the plurality of cover skins to the main body along the one or more ribs subsequent to the positioning step.

In a further embodiment of any of the foregoing embodiments, the plurality of cover skins includes a peripheral cover skin and one or more localized cover skins. The peripheral cover skin includes a perimeter of the cover such that the peripheral cover skin surrounds the one or more localized cover skins subsequent to the positioning step.

In a further embodiment of any of the foregoing embodiments, the welding step includes welding the peripheral cover skin to the main body along the perimeter of the recessed region.

In a further embodiment of any of the foregoing embodiments, the one or more ribs include a first set of ribs and a second set of ribs. Each one of the second set of ribs extend from at least one of the first set of ribs, and the positioning step includes situating one or more of the plurality of cover skins over the second set of ribs.

In a further embodiment of any of the foregoing embodiments, the second set of ribs are spaced apart from the plurality of cover skins.

In a further embodiment of any of the foregoing embodiments, each one of the one or more ribs includes a raised protrusion that extends outwardly from a pedestal portion.

The pedestal portion is dimensioned to support an opposed pair of the plurality of cover skins, and the raised protrusion is dimensioned to abut against the opposed pair.

In a further embodiment of any of the foregoing embodiments, the raised protrusion is dimensioned to extend outwardly from external surfaces of the opposed pair subsequent to the positioning step, and the raised protrusion is consumed during the welding step.

In a further embodiment of any of the foregoing embodiments, the external surface contour of the main body and external surfaces of the plurality of cover skins cooperate to define a pressure side or a suction side of an airfoil.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 9 illustrates one of the cover skins of FIG. 8 mounted on a support structure.
FIG. 9A illustrates a cover skin mounted on a support structure.
FIG. 10 illustrates another one of the cover skins of FIG. 8 mounted on a support structure.

DETAILED DESCRIPTION

Figure 1:
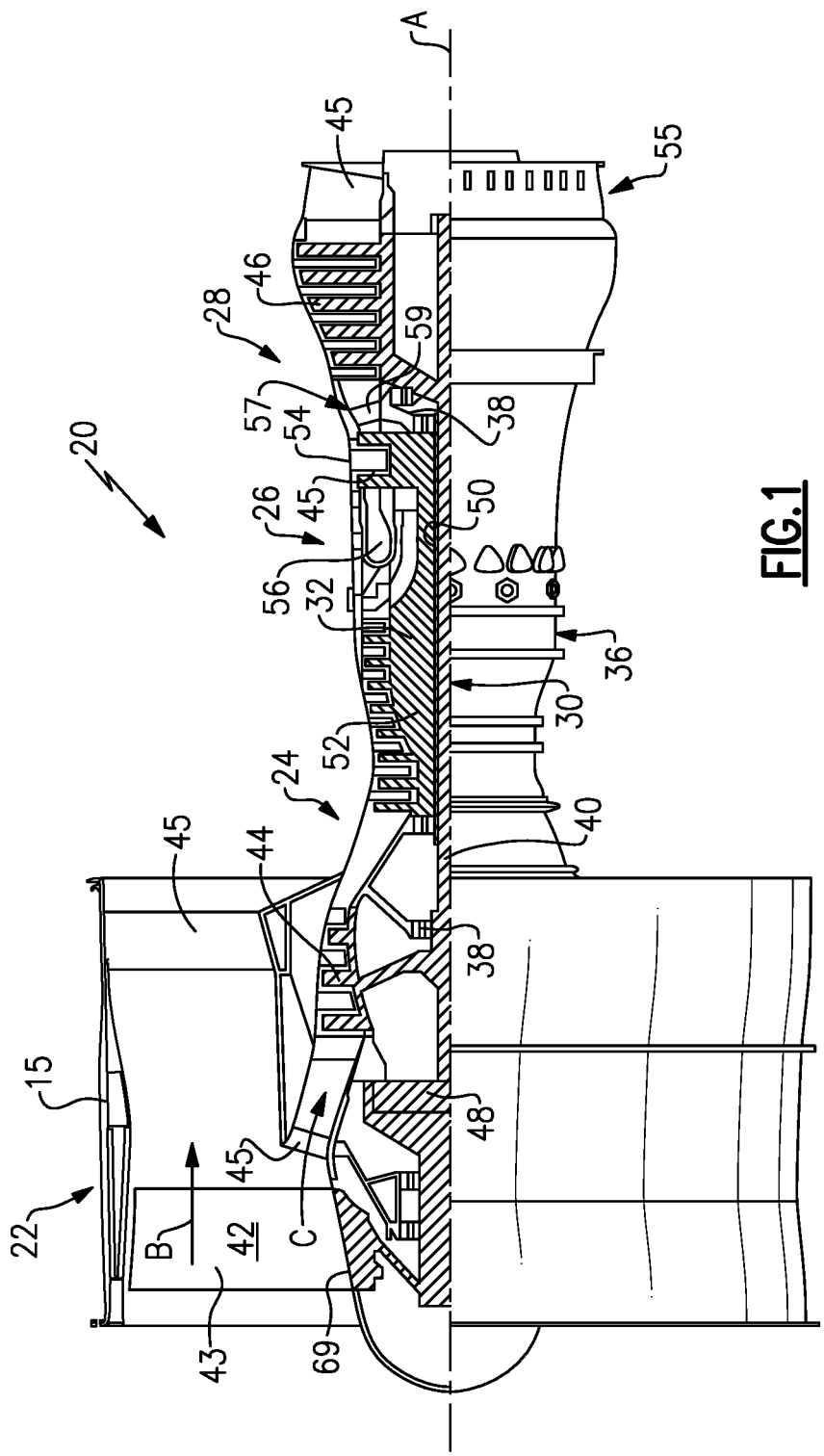
FIG. 1 illustrates an example turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
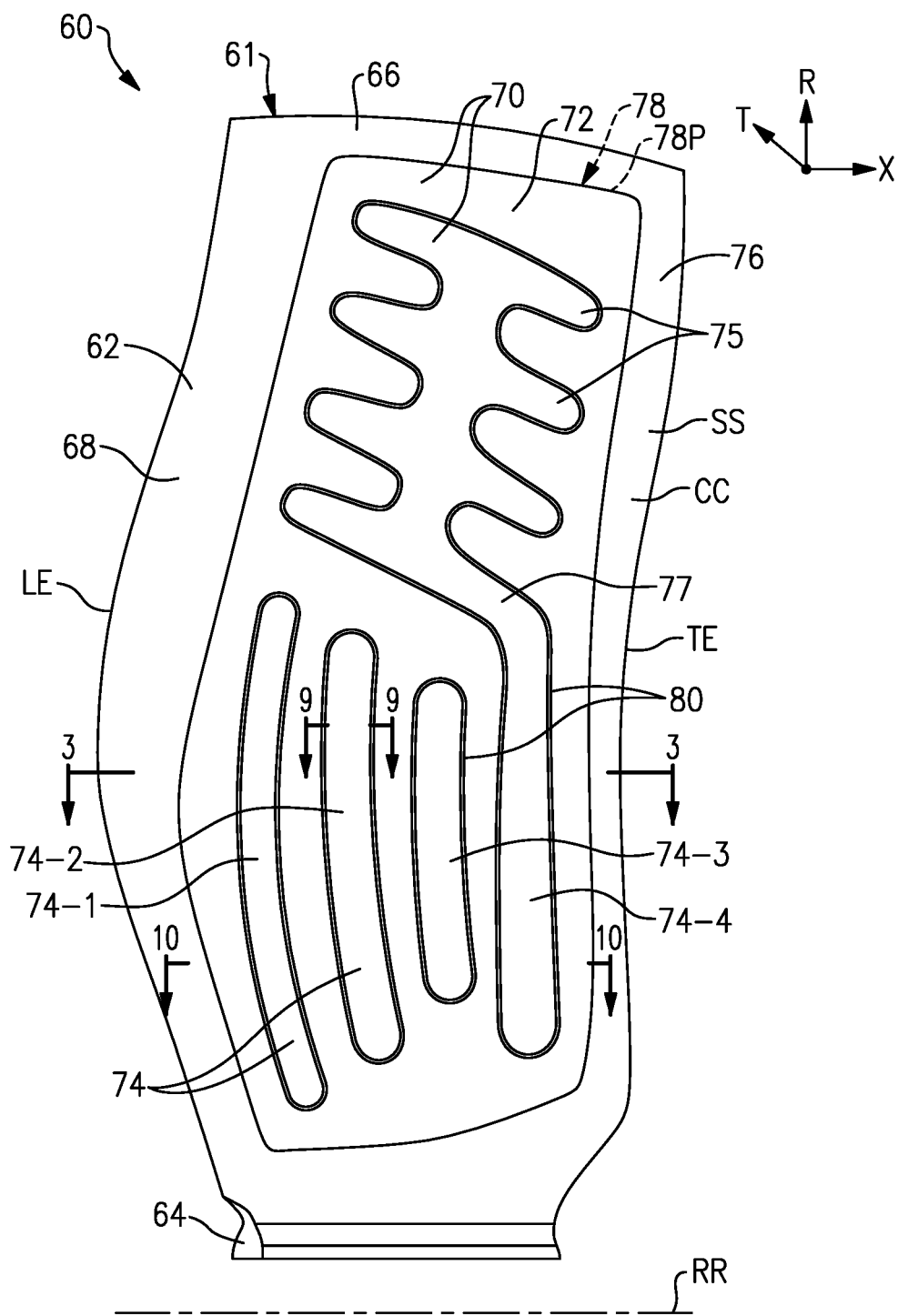
FIG. 2 illustrates a perspective view of a gas turbine engine component having a plurality of cover skins.
Figure 3:
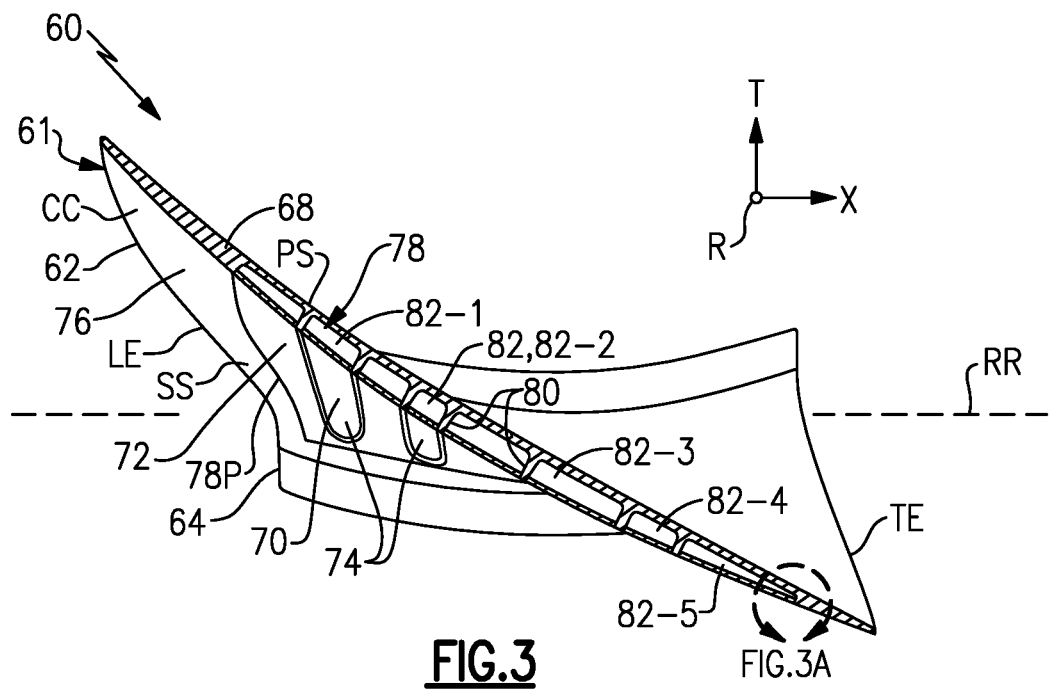
FIG. 3 illustrates a section view of the component taken along line 3-3 of FIG. 2 with the cover skins in an installed position.

FIGS. 2-3 illustrate a gas turbine engine component 60 according to an example. The component 60 can be incorporated in the engine 20 of FIG. 1, for example. In the illustrated example of FIGS. 2-3, the component 60 is an airfoil 61. The fan 42 of FIG. 1 can include a plurality of airfoils or fan blades 43 rotatable about the engine longitudinal axis A, and the airfoil 61 can be one of the fan blades 43. Other types of rotatable blades and airfoils, including struts and static vanes 45 in the fan, compressor and turbine sections 22, 24, 28, mid-turbine frame 57, and turbine exhaust case (TEC) 55 of FIG. 1 may benefit from the examples disclosed herein which are not limited to the design shown. Other portions of the engine 20 including engine cases, generally planar or flat panels or structures, and other systems such as industrial turbines may benefit from the examples disclosed herein.

The airfoil 61 includes an airfoil section 62 extending in a spanwise or radial direction R from a root section 64 to a tip portion 66 (FIG. 2). The root section 64 is a shape that is configured to mount the airfoil 61 in the engine, such as a dovetail shape. The tip portion 66 is a terminal end of the airfoil 61. Generally, one side of the airfoil section 62 is a suction side SS and the other side is a pressure side PS (FIG. 3) separated in a thickness direction T. The pressure side PS has a generally concave profile, and the suction side SS has a generally convex profile. The airfoil section 62 extends in the thickness direction T between the pressure and suction sides PS, SS to define an aerodynamic external surface contour of the airfoil section 62, as illustrated in FIG. 3. The airfoil 61 is rotatable about an axis of rotation RR. The axis of rotation RR can be collinear with or parallel to the engine axis A of the engine 20.

The airfoil section 62 includes a main (or airfoil) body 68 that extends in the radial direction R from the root section 64 to the tip portion 66. The main body 68 extends in a chordwise direction X between a leading edge LE and a trailing edge TE. The main body 68 defines at least one of the pressure and suction sides PS, SS. In the illustrated example of FIGS. 2-3, the main body 68 defines both the pressure and suction sides PS, SS.

The airfoil 61 includes a plurality of cover skins 70 disposed on a surface of the main body 68. The cover skins 70 are arranged to provide a continuous surface with the suction side SS of the airfoil 61 when in an installed position, as illustrated by FIG. 3. In another example, the cover skins 70 are disposed on the pressure side PS of the airfoil 61. The airfoil 61 is illustrated with the cover skins 70 removed in FIG. 4 for illustrative purposes. The component 60 includes two or more cover skins 70 along the pressure and/or suction sides PS, SS of the airfoil section 62.

The main body 68 and cover skins 70 can be made out of metallic materials such as titanium. Other materials can be utilized, including metal alloys and metal matrix composites.

The cover skins 70 include a peripheral cover skin 72 and one or more localized cover skins 74. In the illustrated example of FIGS. 2-3, the airfoil 61 includes four localized cover skins 74 (indicated at 74-1 to 74-4 in FIG. 2) distributed along the airfoil section 62. It should be understood that the component 60 can include fewer or more than four localized cover skins 74 in accordance with the teachings disclosed herein, such as only one localized cover skin 74.

Figure 4:
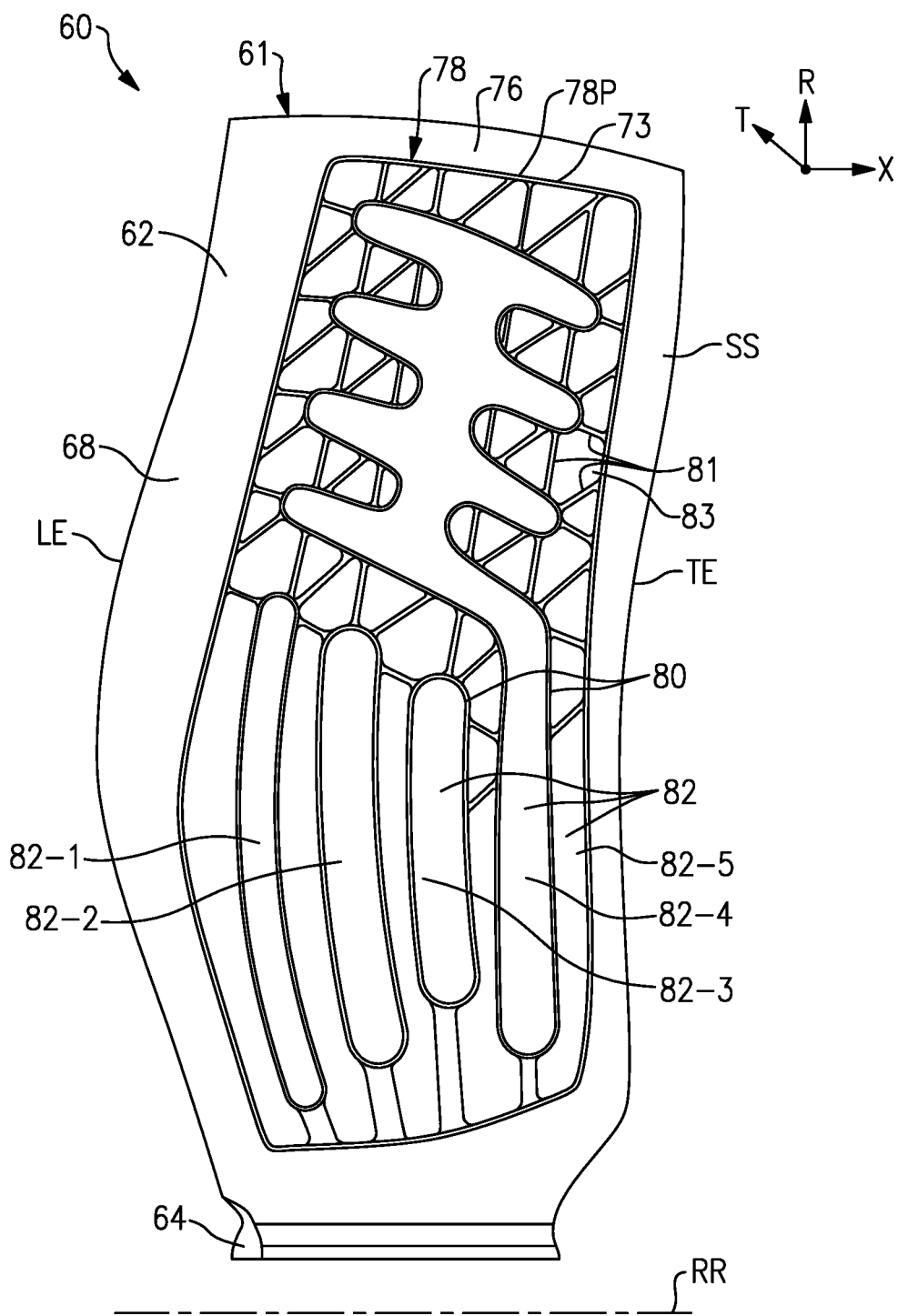
FIG. 4 illustrates the component of FIG. 2 with the cover skins removed.

Referring to FIGS. 3-4 with continuing reference to FIG. 2, a sidewall 76 of the main body 68 defines a recessed region 78 that is dimensioned to at least partially receive the cover skins 70. The recessed region 78 extends inwardly from at least one of the pressure and suction sides PS, SS defined by the sidewall 76, such as the suction side SS as illustrated in FIGS. 3-4. The sidewall 76 includes one or more support ribs 80 that divide the recessed region 78 into, or otherwise define, a plurality of internal cavities or pockets 82 within a perimeter 78P of the recessed region 78. In the illustrated example of FIG. 4, the sidewall 76 defines at least five separate and distinct pockets 82 (indicated at 82-1 to 82-5) bounded by the support ribs 80. The pockets 82 can serve to reduce an overall weight of the component 60. The support ribs 80 are dimensioned to abut against and support respective cover skins 70.

The main body 68 can include a plurality of stiffening ribs 81 (FIG. 4) extending from the support ribs 80 and/or perimeter 78P of the recessed region 78. In the illustrative example of FIG. 4, each stiffening rib 81 interconnects one of the support ribs 80 with another support rib 80 or the perimeter 78P of the recessed region 78. The stiffening ribs 81 extend outwardly from a floor 83 (FIG. 4) of the respective pocket 82. The stiffening ribs 81 can serve to provide rigidity or stiffening to the main body 68. The stiffening ribs 81 can be dimensioned to allow the main body 68 to flex to absorb impacts from foreign objection debris (FOD), which can reduce strain along weld joints.

The cover skins 72, 74 are dimensioned to mate with a perimeter of respective ones of the pockets 82 defined by the ribs 80 and/or perimeter 78P of the recessed region 78. The localized cover skins 74 are dimensioned to enclose respective ones of pockets 82, and the peripheral cover skin 72 is dimensioned to enclose pocket 82-5 such that the peripheral cover skin 72 surrounds each one of the localized cover skins 74 in an installed position as illustrated by FIG. 3. The cover skins 70 are dimensioned such that each cover skin 72, 74 encloses only one of the pockets 82. In other examples, one or more of the cover skins 72, 74 enclose two or more adjacent pockets 82. The localized cover skins 74 are spaced apart from each other and from the perimeter 78P of the recessed region 78 in the installed position, as illustrated in FIG. 2.

Figure 3A:
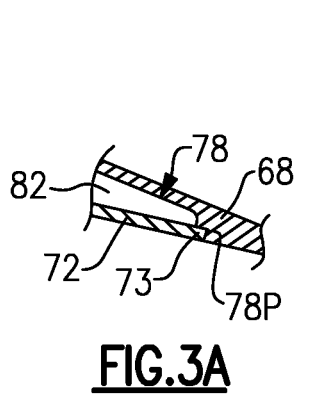
FIG. 3A illustrates selected portions of the component of FIG. 3.

The main body 68 defines a shelf 73 along the perimeter 78P of the recessed region 78, as illustrated by FIGS. 3A and 4. The shelf 73 is dimensioned to at least partially receive and mate with a perimeter of the peripheral cover skin 72.

Figure 3B:
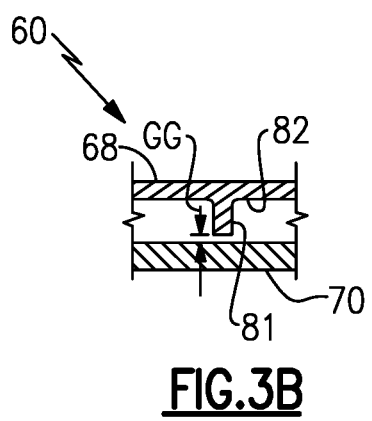
FIG. 3B illustrates a sectional view a stiffening rib of the component of FIG. 3.

Positioning the cover skins 70 can include situating one or more of the cover skins over the stiffening ribs 81, as illustrated by cover skin 70 in FIG. 3B. Each stiffening rib 81 can be dimensioned to be spaced apart from adjacent ones of the cover skins 70 to define a clearance gap GG.

The cover skins 70 and pockets 82 can have various geometries, including a generally elongated, oblong or racetrack shaped geometry as illustrated by localized cover skins 74-1 to 74-3 (FIG. 2) and pockets 82-1 to 82-3 (FIG. 4). Other geometries can include a complex profile as illustrated by localized cover skin 74-4 (FIG. 2) and pocket 82-4. In the illustrated example of FIG. 2, localized cover skin 74-4 includes a plurality of branch segments 75 extending from an elongated body 77. It should be appreciated that each cover skin, rib and pocket and can have different dimensions, shapes and/or orientations than illustrated in the disclosed figures. The geometry of the pockets can be the same or can differ. Other example geometries of the cover skins, ribs and pockets can include circular or elliptical, rectangular and triangular geometries. At least some of the ribs can be generally linear or curvilinear.

The cover skins 70 are mechanically attached to the main body 68 along the support ribs 80 and/or perimeter 78P of the recessed region 78 to enclose respective ones of the pockets 82. Various techniques can be used to mechanically attach the cover skins 70 to the main body 68, including laser or electron beam welding, brazing, diffusion bonding or other fastening techniques. In the illustrated example of FIGS. 2-3 and 3A, the peripheral cover skin 72 is welded to the main body 68 along the perimeter 78P of the recessed region 78 such that the peripheral cover skin 72 surrounds the localized cover skins 74 in the installed position. The pockets 82 can substantially or completely free of any material such that the airfoil section 62 is hollow in an assembled condition.

Figure 5:
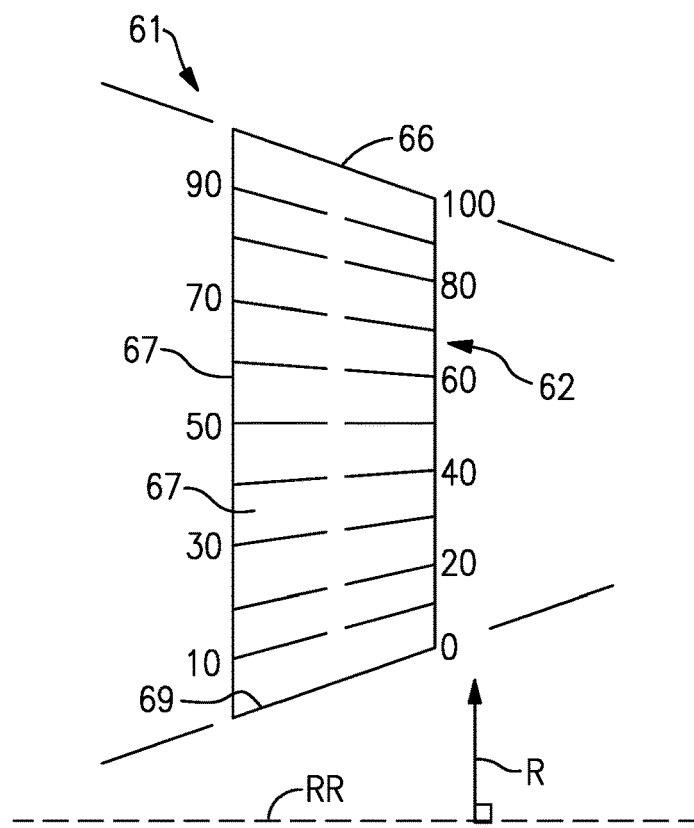
FIG. 5 is a schematic view of airfoil span positions.

Referring to FIG. 5, span positions of the airfoil section 62 are schematically illustrated from 0% to 100% in 10% increments to define a plurality of sections 67. Each section 67 at a given span position is provided by a conical cut that corresponds to the shape of segments a flowpath (e.g., bypass flowpath B or core flow path C of FIG. 1), as shown by the large dashed lines. The airfoil section 62 extends from a platform 69 (see also FIG. 1). In the case of an airfoil 61 with an integral platform, the 0% span position corresponds to the radially innermost location where the airfoil section 62 meets the fillet joining the airfoil section 62 to the platform 69. In the case of an airfoil 61 without an integral platform, the 0% span position corresponds to the radially innermost location where the discrete platform 69 (see also FIG. 1) meets the exterior surface of the airfoil section 62. A 100% span position corresponds to a section of the airfoil section 62 at the tip portion 66.

Figure 6:
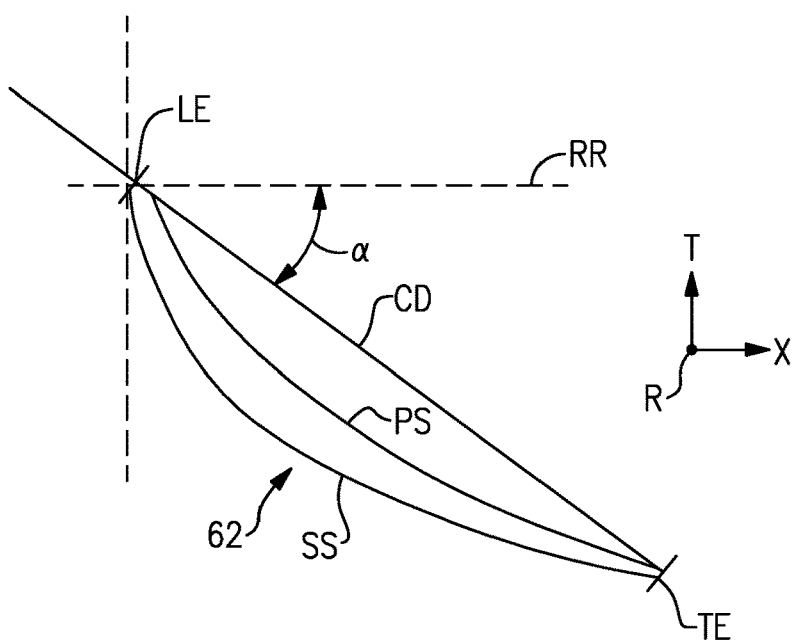
FIG. 6 is a schematic view of an airfoil section depicting a stagger angle at a span position of FIG. 5.

Referring to FIG. 6, with continuing reference to FIG. 5, the airfoil section 62 is sectioned at a radial position between the root section 64 (FIG. 2) and tip portion 66. In examples, each airfoil section 62 is specifically twisted about a spanwise axis in the radial direction R with a corresponding stagger angle $\alpha$ at each span position. Chord CD, which is a length between the leading and trailing edges LE, TE, forms stagger angle $\alpha$ relative to the chordwise direction X or a plane parallel to the axis or rotation RR. The stagger angle $\alpha$ can vary along the span of the airfoil section 62 to define a twist. For example, the tip portion 66 can define a stagger angle $\alpha$ relative to the root section 64 that is greater than or equal to 5 degrees or 10 degrees, absolute. In some examples, the stagger angle $\alpha$ at the tip portion 66 relative to the root section 64 is between 5-60 degrees, absolute, or more narrowly between 10-30 degrees, absolute, such that the airfoil section 62 is twisted about a spanwise axis as illustrated by the airfoil 61 of FIGS. 2-3. The airfoil section 62 can be three-dimensionally twisted about the spanwise axis.

Figure 7:
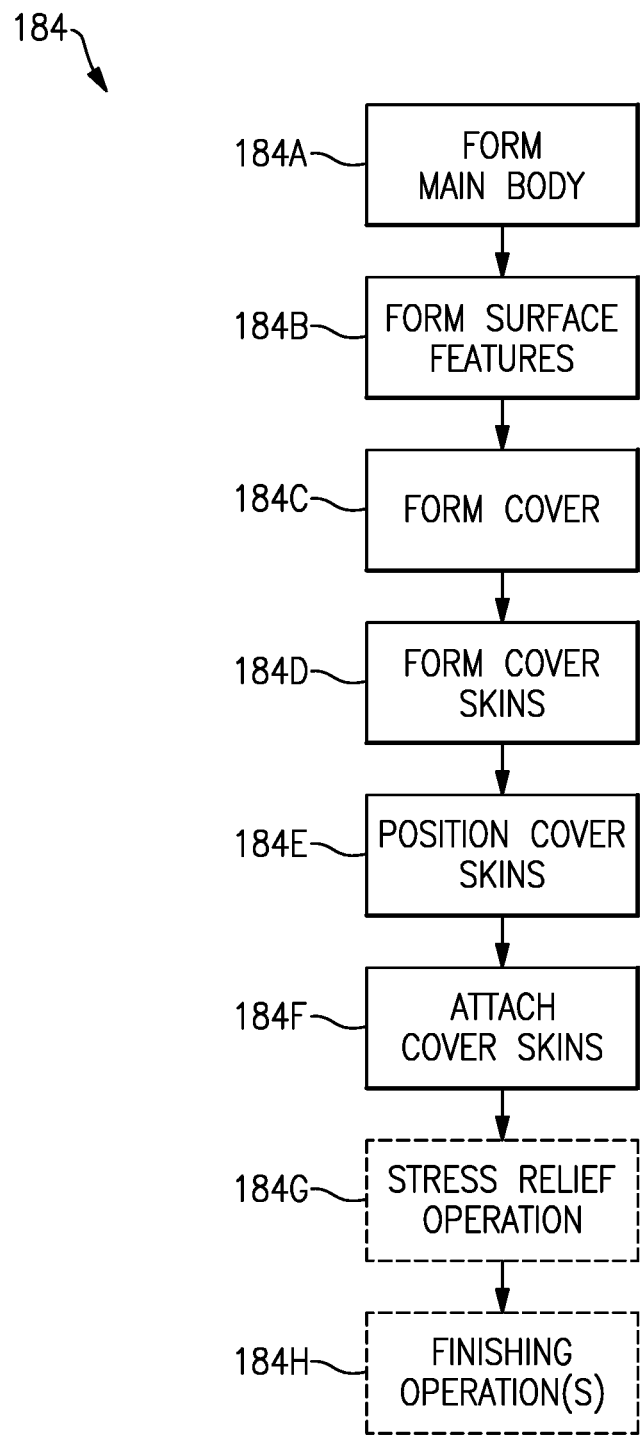
FIG. 7 illustrates a process for forming a gas turbine engine component.

FIG. 7 illustrates a process of constructing or forming a gas turbine engine component in a flow chart 184. The process can be utilized to form a hollow component such as the airfoil 61 of FIGS. 2-4, or another component such as a solid airfoil, or another component of the engine 20 including static vanes and struts, for example. Reference is made to the component 60 of FIGS. 2-4 and a component 160 of FIG. 8 for illustrative purposes. In this disclosure, like reference numerals designate like elements where appropriate and reference numerals with the addition of one-hundred or multiples thereof designate modified elements that are understood to incorporate the same features and benefits of the corresponding original elements.

Figure 8:
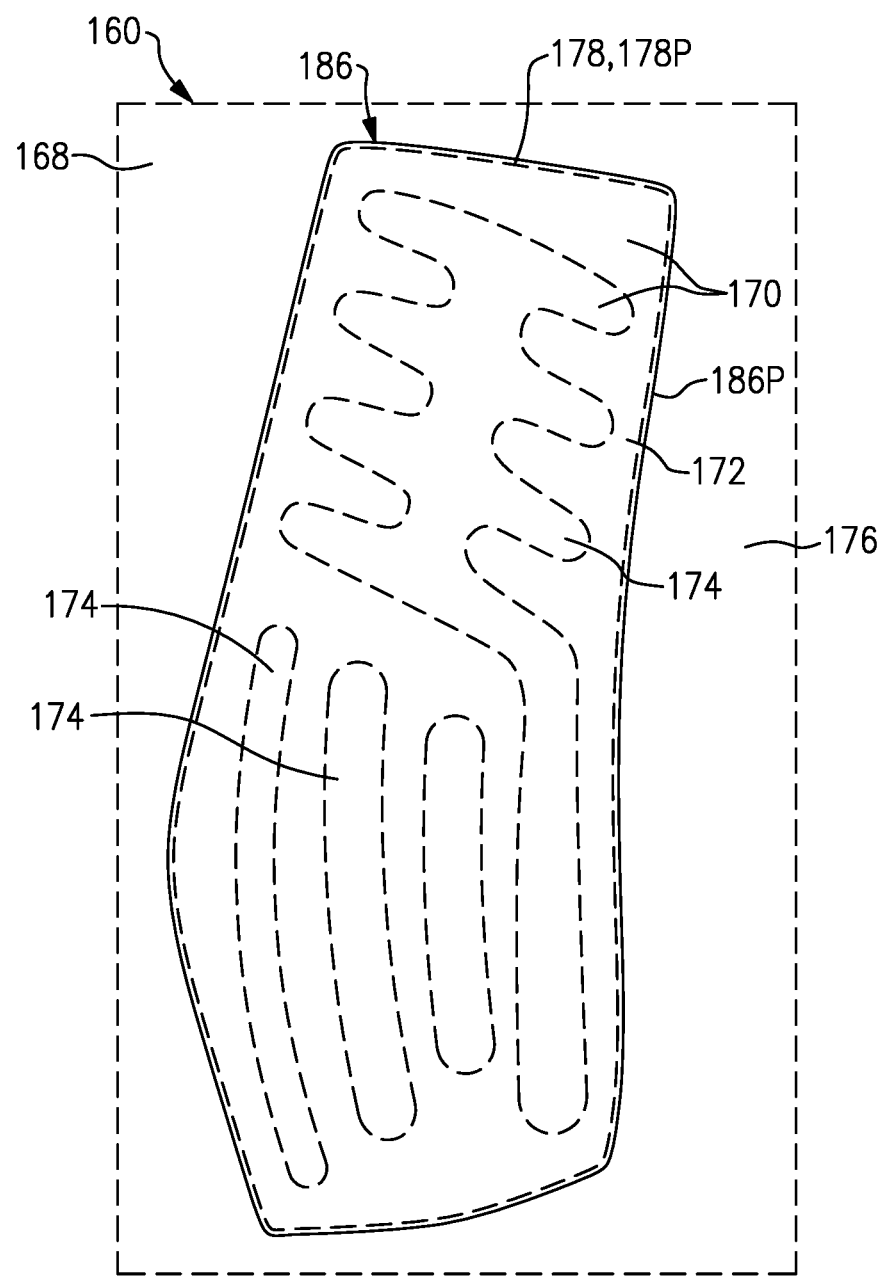
FIG. 8 illustrates a gas turbine engine component including cover skins formed from a common cover.

Referring to FIGS. 7-8, a main body 168 of the component 160 (shown in dashed lines for illustrative purposes) can be prepared or otherwise formed at step 184A. The main body 168 can be formed with respect to a predefined geometry, which can be defined with respect to one or more design criterion. Step 184A can include mounting the main body 168 to a tool and machining internal and/or external surfaces of the main body 168 with respect to the predefined geometry, such as the aerodynamic external surface contour CC of the airfoil section 62 of FIGS. 2-3 characterized by a three-dimensional twist.

At step 184B, one or more surface features are formed or otherwise defined in the sidewall 176 of the main body 168. In the illustrated example of FIGS. 3-4, the surface features include the recessed region 78, shelf 73, pockets 82 and ribs 80 distributed along the sidewall 76 of the main body 68. The recessed region 78 is divided into two or more pockets 82 between one or more ribs 80 such that the pockets 82 are surrounded by the perimeter 78P of the recessed region 78. The main body 68 and surfaces features including the shelf 73, recessed region 78, ribs 80 and pockets 82 can be forged, cast, machined or produced by additive manufacturing from a metal or metal alloy, for example.

A common cover 186 is formed at step 184C. The cover 186 can be forged, machined or produced by additive manufacturing from a metal or metal alloy, for example. In examples, the cover 186 is formed from a sheet metal body having a substantially planar geometry. For the purposes of this disclosure, the term "substantially" means±3 percent of the respective value unless otherwise stated.

Forming the common cover 186 can include contouring, permanently reshaping or otherwise dimensioning the cover 186 according or with respect to an external surface contour or profile of the main body 168 of the component 160, such as the external surface contour CC of the airfoil section 62 of FIGS. 2-3. Various techniques can be utilized to contour the cover 186, including hot forming and machining. The cover 186 can be contoured with respect to a stagger angle of the respective airfoil that is twisted to define the predefined contour, including any of the stagger angles disclosed herein, as illustrated by airfoil 61 of FIGS. 2-3.

Forming the common cover 186 occurs such that a perimeter 186P of the common cover 186 is dimensioned to mate with the perimeter 78P of the recessed region 78 (shown in dashed lines in FIG. 8 for illustrative purposes). In an installed position, the external surface contour of the main body 168 and external surfaces of the cover skins 170 can cooperate to define a pressure side or a suction side of an airfoil, as illustrated by cover skins 70 of FIGS. 2 and 3.

A plurality of cover skins 170 are formed from the common cover 186 at step 184D. Step 184D includes dividing or segmenting the common cover 186 (e.g., along the dashed lines illustrated in FIG. 8) to form the cover skins 170. The resultant cover skins 170 mounted to the main body 168 are separate and distinct components. Various techniques can be utilized to form the cover skins 170 from the common cover 186, such as laser cutting or another machining technique.

Step 184D can occur subsequent to contouring or otherwise forming the common cover 186 at step 184C, which can reduce manufacturing complexity in forming the cover skins 170 according to an external surface profile of the component mounting the cover skins 170. The peripheral cover skin 172 comprises the perimeter 186P of the common cover 186 such that the peripheral cover skin 172 surrounds the localized cover skins 174 in the installed position, as illustrated by the cover skins 72, 74 of FIG. 2.

Figure 8A:
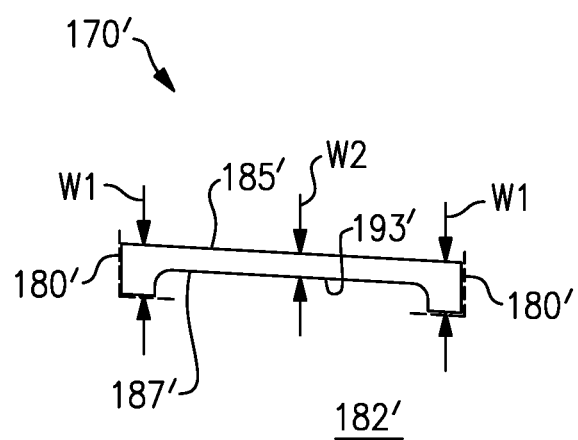
FIG. 8A illustrates a cover skin according to an example.
Figure 8B:
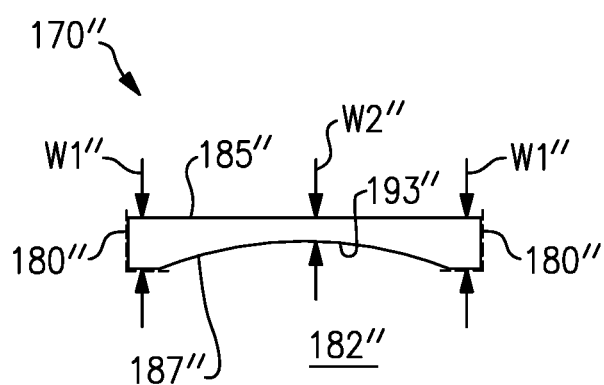
FIG. 8B illustrates a cover skin according to another example.

Step 184D can include forming pedestal cover skins containing one or more recesses within the internal surfaces of a thicker-than-normal common cover 186 and/or cover skin 170. As illustrated in FIG. 8A, cover skin 170' includes external surfaces 185' and internal surfaces 187' opposed to the external surfaces 185'. The external surfaces 185' can define an external surface contour of the cover skin 170', and internal surfaces 187' can bound a cavity or pocket 182'. The cover skin 170' can be chemically milled or otherwise machined to form a recess 193'. The cover skin 170' defines a first width W1 along a perimeter of the cover skin 170' and defines a second width W2 along the recess 193'. The recess 193' can have a radiused transition from first width W1 to a second width W2 as in FIG. 8A or can have a generally arcuate, concave profile as illustrated by recess 193" of FIG. 8B such that first width W1" is greater than second width W2" at a valley of the recess 193'/193". Incorporation of a pedestal cover skin can reduce the stress concentration at a juncture of support rib 180'/180" (shown in dashed lines in FIGS. 8A-8B for illustrative purposes) and cover skin 170'/170", which can result in improved fatigue life.

Referring to FIGS. 7 and 9-10, a perimeter of the cover skins 170 can be machined or otherwise re-dimensioned subsequent to dividing the common cover 186 according to a predefined geometry of the surface features of the component 160, such as the support ribs 80 and perimeter 78P of the recessed region 78 of the airfoil 61 of FIGS. 2-4.

Each of the localized cover skins 174 (one shown in FIG. 9 for illustrative purposes) and the peripheral cover skin 172 (FIG. 10) can be mounted on a respective support structure 188, 189. Each support structure 188, 189 can be a vacuum chuck suctioning system having a vacuum chuck contoured to a surface profile of the respective cover skin 170. A machining assembly 190, 191 (shown in dashed lines for illustrative purposes) including a respective controller CONT and one or more cutting tools CT can be utilized to resize or machine a perimeter of the respective cover skins 172, 174. Each cutting tool CT can be an endmill that is operable to mill the respective cover skin 172, 174 with respect to a predefined geometry, for example. The cover skins 172, 174 are re-dimensioned with respect to a width of the support ribs 180 and perimeter 178P of the recessed region 178 utilizing other techniques, such as laser cutting in an argon gas environment which can reduce a likelihood of surface contamination. Surfaces of the component 160 can be cleaned prior to positioning the cover skins 170.

In the illustrative examples of FIGS. 9-10, a concave surface of the cover skins 170 mounted to the support structure 188, 189. In other examples, a convex surface of cover skin 170' is mounted to support structure 188'/189' as illustrated by FIG. 9A.

Figure 11:
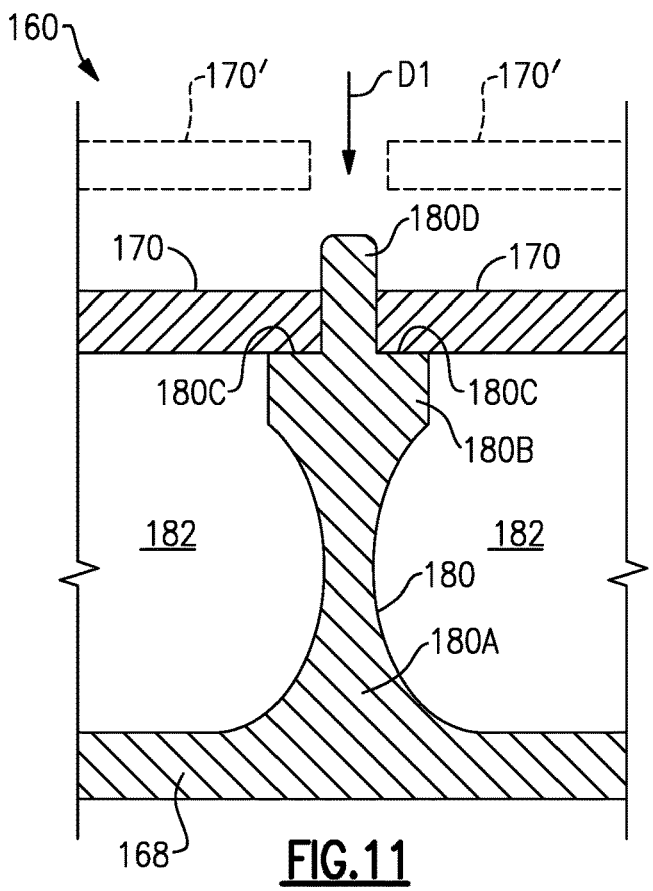
FIG. 11 illustrates adjacent cover skins positioned relative to a support rib of the component of FIG. 8.

Referring to FIGS. 7 and 11, at step 184E the cover skins 170 are positioned relative to the main body 168 including moving cover skins 170' (shown in dashed lines for illustrative purposes) in direction D1 and into abutment with each adjacent rib 180 to enclose respective ones of the pockets 182. The cover skins 170 can be positioned such that the peripheral cover skin 172 surrounds the localized cover skins 174, as illustrated by cover skins 72, 74 of FIG. 2.

Each support rib 180 includes a neck portion 180A extending from a wall of the main body 168 and a pedestal portion 180B. The pedestal portion 180B has a pair of shelves 180C that are dimensioned to support an opposed pair of the cover skins 170. In examples, the pedestal portion 180B has a width of about 0.06-0.09 inches. Each rib 180 can include a raised protrusion 180D extending outwardly from the pedestal portion 180B to define a terminal portion of the rib 180. The pedestal portion 180B can reduce stress concentrations at a junction between the rib 180 and the respective cover skin 170.

The raised protrusion 180D is dimensioned to extend between, and space apart the cover skins 170. The raised protrusion 180D can be dimensioned to abut against the cover skins 170 in an installed position. In examples, the raised protrusion 180D has a width of approximately 0.025 inches. In the illustrative example of FIG. 11, the raised protrusion 180D is integral with the pedestal portion 180B. In other examples, the raised protrusion 180D is a separate and distinct component mechanically attached to the pedestal portion 180B of the respective rib 180.

Figure 11A:
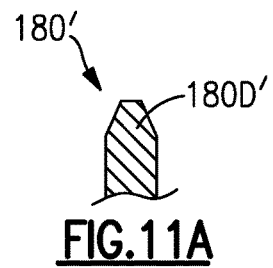
FIG. 11A illustrates a support rib according to another example.
Figure 11B:
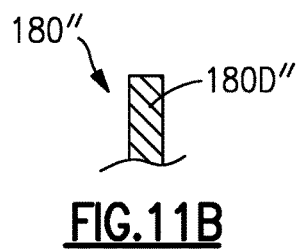
FIG. 11B illustrates a support rib according to yet another example.

In the illustrative example of FIG. 11, the raised protrusion 180D is dimensioned to extend outwardly of external surfaces of the cover skins 170 subsequent to positioning the cover skins 170 to cover the respective pockets 182. The raised protrusion 180 can have a generally rounded or tapered cross-sectional profile that serves to guide the cover skins 170' toward the shelves 180C, which can reduce complexity in positioning the cover skins 170 relative to the main body 168. In other examples, the raised protrusion 180D is omitted. Other geometries of the raised protrusion 180 can be utilized, such as raised protrusion 180D' having chamfered surfaces as illustrated in FIG. 11A and a generally rectangular geometry as illustrated by raised protrusion 180D" in FIG. 11B.

Figure 12:
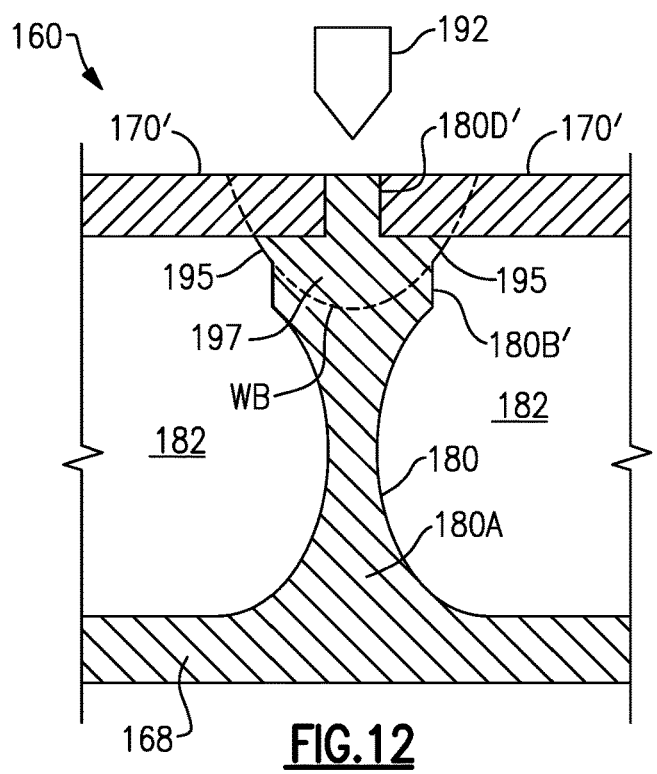
FIG. 12 illustrates adjacent cover skins attached to the support rib of FIG. 11.

Referring to FIGS. 7 and 12, at step 184F surfaces of each cover skin 170 are mechanically attached to surfaces of the main body 168 along the respective rib 180 subsequent to positioning the cover skins 170 at step 184E. Any of the techniques disclosed herein can be utilized to mechanically attach the cover skins 170 to the main body 168, including welding the cover skins 170 along the respective ribs 180 with a welding system 192. The main body 168 can be mounted in a welding fixture. The cover skins 170 are positioned relative to the main body 168 and held against the main body 168 such that the ribs 180 directly abut against the cover skins 170 adjacent to the weld lines.

The cover skins 170 can be welded to the main body 168 along each raised protrusion 180D (FIG. 11), which is consumed during the welding such that the resulting weld 197 is slightly below or substantially flush with the external surfaces of the adjacent cover skins 170, as illustrated by FIG. 12. Weld beam WB and respective edges of pedestal portion 180B', raised protrusion 180D', and cover skins 170' incorporated into the weld 197 are shown in dashed lines in FIG. 12 for illustrative purposes. The raised protrusion 180D provides integral filler material to supplement weld metal drop-through that may occur during formation of internal fillets 195 on either side of the rib 180. Utilizing the raised protrusion 180D to provide filler material may serve to reduce a thickness of the adjacent cover skins 170, which may otherwise be a relative greater thickness for underfill. A reduction in thickness may reduce material utilization and cost in fabricating the component 160. The raised protrusion 180D can serve as a tracking feature during welding, can reduce a depth of a surface depression in external surfaces of the component 160 adjacent the weld 197, and can reduce a need for attaching the cover skins 170 to the ribs 180 or other portions of the main body 168 utilizing a blind weld technique.

Figure 13:
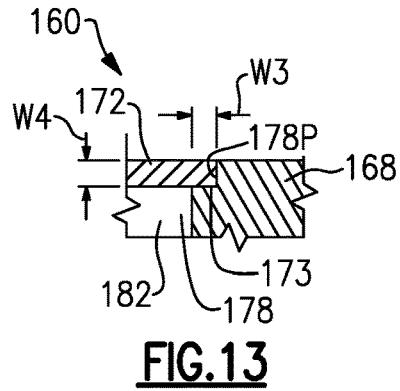
FIG. 13 illustrates a cover skin attached to a main body of the component of FIG. 8.

Step 184F can include welding a perimeter of the peripheral cover skin 172 to the main body 168 along a perimeter 178P of the recessed region 178, as illustrated by FIG. 13. A width W3 of shelf 173 can be less than or equal to a thickness or width W4 of cover skin 172, as illustrated in FIG. 13, which can reduce a size of the resultant weld. In examples, the perimeter of the cover skin 172 is welded to the perimeter 178P of the recessed region 178 prior to welding the localized cover skins 174, which can reduce overall distortion of the component 160. A stress relief or creep form operation can be performed at step 184G to relieve stresses in the component 160 caused by welding the cover skins 172, 174 and main body 168. One or more finishing operations can be performed at step 184H, including machining external surfaces of the component 160 according to a predefined surface contour.

Figure 14:
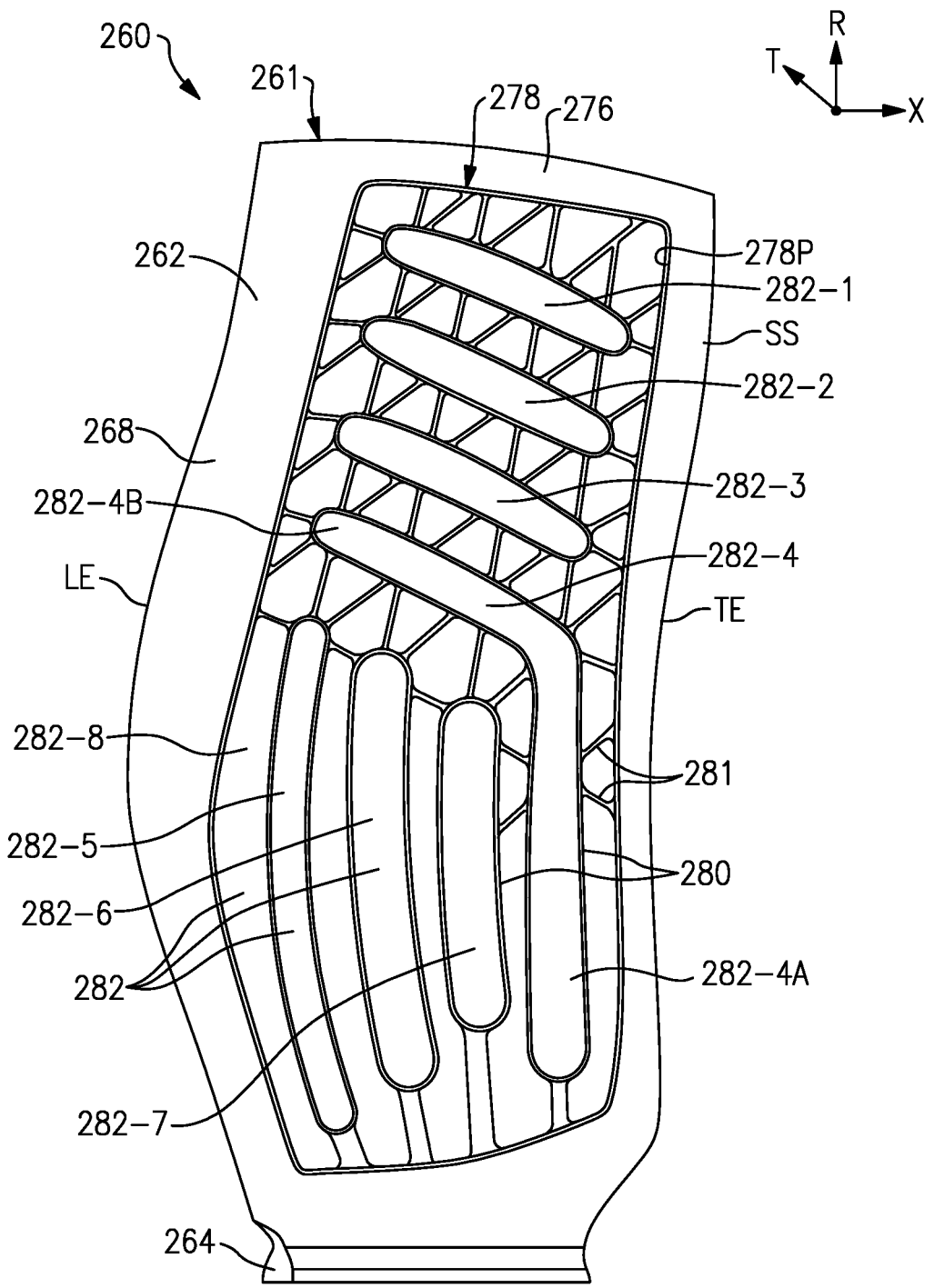
FIG. 14 illustrates a perspective view of a gas turbine engine component according to another example.

FIG. 14 illustrates a component 260 according to another example. In the illustrative example of FIG. 14, the component 260 is an airfoil 261 including a main (or airfoil) body 268 having a plurality of support ribs 280 that bound or otherwise define a plurality of cavities or pockets 282 within a perimeter 278P of a recessed region 278. The ribs 280 are arranged to define seven separate and distinct pockets 282 (illustrated at 282-1 to 282-7).

A first set of the pockets 282-1 to 282-3 are dimensioned to have a major component that extends in a chordwise direction X. Pockets 282-1 to 282-3 are arranged to be generally parallel to each other. A second set of the pockets 282-5 to 282-7 are dimensioned to have a major component that extends in a spanwise or radial direction R. Pockets 282-5 to 282-7 are arranged to be generally parallel to each other and are generally traverse to the pockets 282-1 to 282-3.

Pocket 282-4 includes a first segment 282-4A and a second segment 282-4B extending transversely from an end portion of the first segment 282-4A. The first segment 282-4A is dimensioned to have a major component that extends in the radial direction R. The second segment 282-4B is dimensioned to have a major component that extends in the chordwise direction X such that pocket 282-4 spaces apart the first set of pockets 282-1 to 282-3 from the second set of pockets 282-5 to 282-7. Another pocket 282-8 follows or is otherwise defined by the perimeter 278P of the recessed region 278. Stiffening ribs 281 extend along a floor of the pocket 282-8 to provide rigidity to the main body 268. Pockets 282-1 to 282-7 are free of any stiffening ribs. Each pocket 282 can be enclosed by a respective cover skin utilizing any of the techniques disclosed herein.

Figure 15:
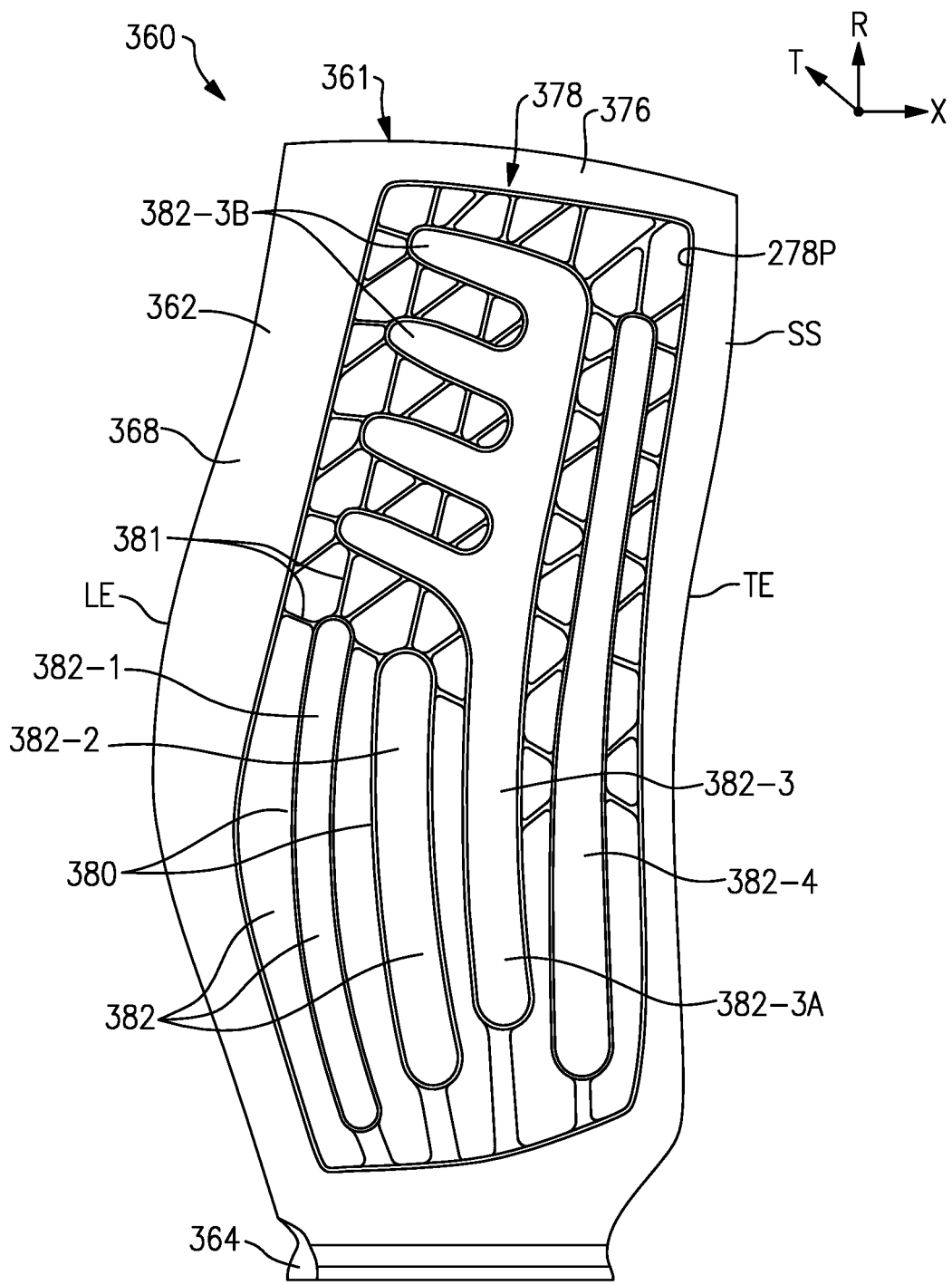
FIG. 15 illustrates a perspective view of a gas turbine engine component according to yet another example.

FIG. 15 illustrates a component 360 according to yet another example. In the illustrative example of FIG. 15, the component 360 is an airfoil 361. A main (or airfoil) body 368 of component 360 defines a plurality of cavities or pockets 382 (indicated at 382-1 to 382-4). Pockets 382-1, 382-2 and 382-4 are dimensioned to have a major component that extends in a spanwise or radial direction R. Pocket 382-3 includes a first segment 382-3A and one or more branched (second) segments 382-3B. The branched segments 382-3B extend outwardly at spaced intervals along a length of the first segment 382-3A. The first segment 382-3A can be dimensioned to have a major component that extends in the radial direction R, and each branched segment 382-3B can be dimensioned to have a major component that extends in the chordwise direction X, for example.

Figure 16:
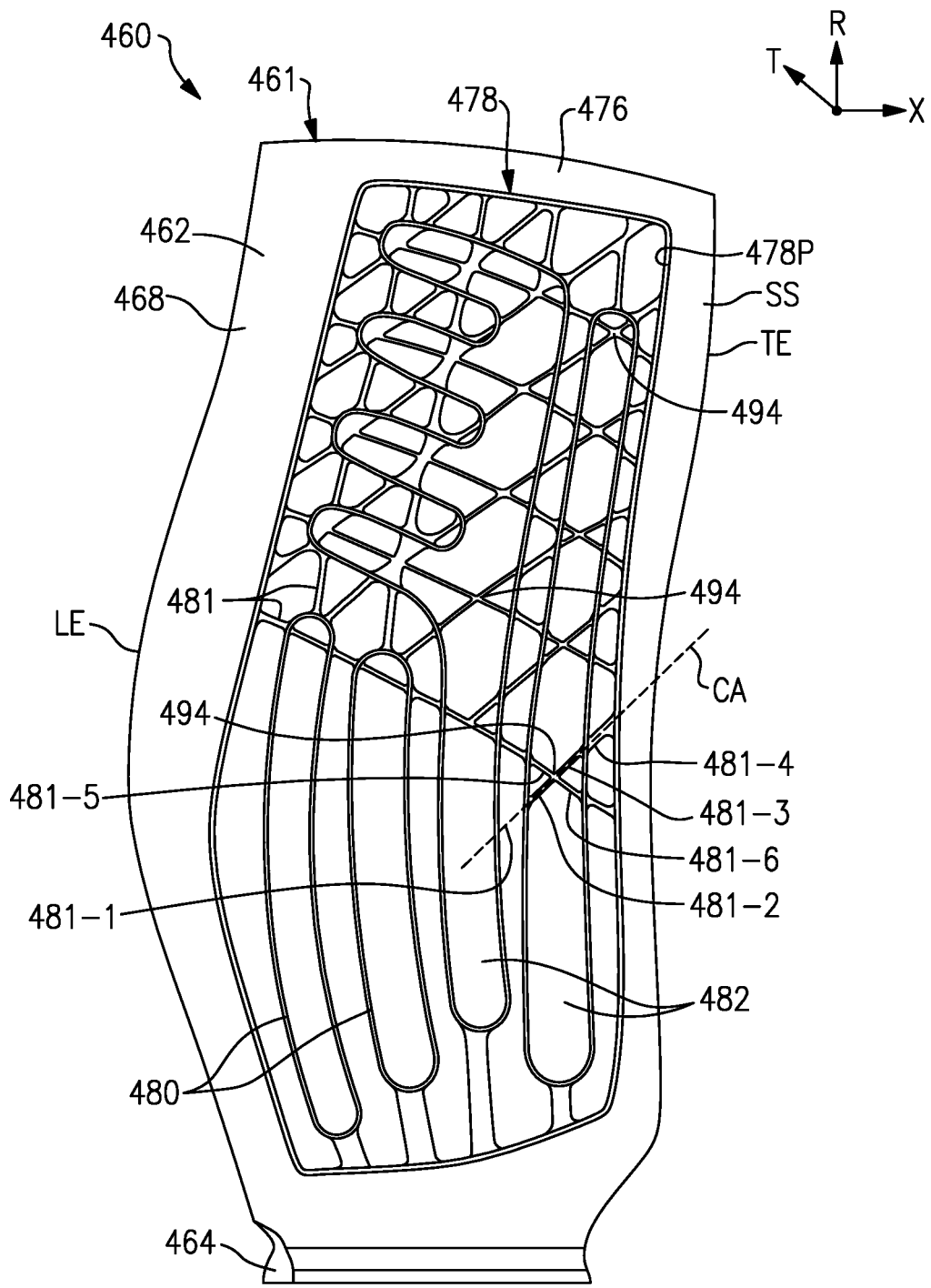
FIG. 16 illustrates a perspective view of a gas turbine engine component according to another example.

FIG. 16 illustrates a component 460 according to another example. In the illustrative example of FIG. 16, the component 460 is an airfoil 461. Main body 468 includes a plurality of support ribs 480 that define a plurality (or first set) of cavities or pockets 482 and a plurality (or second set) of stiffening ribs 481. The pockets 482 can have a substantially similar profile as the pockets 382 of FIG. 15.

At least some of the stiffening ribs 481 extend between opposed walls of a respective one of the pockets 482 encircled by the support ribs 480. At least some of the stiffening ribs 481 can be substantially aligned along a common axis CA, as illustrated by stiffening ribs 481-1 to 481-4. At least some of the stiffening ribs 481 can be joined at a common node 494, as illustrated by stiffening ribs 481-2, 481-3, 481-5 and 481-6.

Utilizing the techniques disclosed herein, the cover skins can be attached to the main body without the need for utilizing blind weld techniques. The raised protrusion pedestal support rib can reduce operating stresses at the weld joint, incorporate a consumable welding tracking feature that provides additional weld filler to improve filling of an external surface depression of the cover skin that may be created by formation of internal fillets during welding, and can reduce complexity in fabricating cover skins from a common workpiece or cover to mate with a geometry of a three-dimensionally twisted airfoil.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of forming a gas turbine engine component comprising:
   forming a recessed region in a sidewall of a main body;
   dividing the recessed region into a plurality of pockets between one or more ribs such that the plurality of pockets are surrounded by a perimeter of the recessed region;
   contouring a cover according to an external surface contour of the main body such that a perimeter of the cover is dimensioned to mate with the perimeter of the recessed region;
   dividing the cover to form a plurality of cover skins subsequent to the contouring step;
   positioning the plurality of cover skins to enclose respective ones of the plurality of pockets; and
   welding the plurality of cover skins to the main body along the one or more ribs subsequent to the positioning step;
   wherein the plurality of cover skins includes a peripheral cover skin and one or more localized cover skins, the peripheral cover skin comprising a perimeter of the cover such that the peripheral cover skin surrounds the one or more localized cover skins subsequent to the positioning step;
   wherein the one or more ribs include a first set of ribs and a second set of ribs, each one of the second set of ribs extending from at least one of the first set of ribs, and the positioning step includes situating one or more of the plurality of cover skins over the second set of ribs; and
   wherein the second set of ribs are spaced apart from the plurality of cover skins.

2. The method as recited in claim 1, wherein the welding step includes welding the peripheral cover skin to the main body along the perimeter of the recessed region.

3. The method as recited in claim 1, wherein each one of the one or more ribs includes a raised protrusion that extends outwardly from a pedestal portion, the pedestal portion dimensioned to support an opposed pair of the plurality of cover skins, and the raised protrusion is dimensioned to abut against the opposed pair.

4. The method as recited in claim 3, wherein the raised protrusion is dimensioned to extend outwardly from external surfaces of the opposed pair subsequent to the positioning step, and the raised protrusion is consumed during the welding step.

5. The method as recited in claim 1, wherein the external surface contour of the main body and external surfaces of the plurality of cover skins cooperate to define a pressure side or a suction side of an airfoil.

6. A method of forming a gas turbine engine component comprising:
   forming a recessed region in a sidewall of a main body;
   dividing the recessed region into a plurality of pockets between one or more ribs such that the plurality of pockets are surrounded by a perimeter of the recessed region;
   contouring a cover according to an external surface contour of the main body such that a perimeter of the cover is dimensioned to mate with the perimeter of the recessed region;
   dividing the cover to form a plurality of cover skins subsequent to the contouring step;
   positioning the plurality of cover skins to enclose respective ones of the plurality of pockets; and
   welding the plurality of cover skins to the main body along the one or more ribs subsequent to the positioning step;
   wherein the step of dividing the cover occurs such that the plurality of cover skins includes a peripheral cover skin and a plurality of localized cover skins, the peripheral cover skin comprising a perimeter of the cover;
   wherein the positioning step includes positioning the peripheral cover skin to surround the plurality of localized cover skins;
   wherein the welding step includes welding the peripheral cover skin to the main body along the perimeter of the recessed region; and
   wherein the positioning step occurs such that the localized cover skins are spaced apart from each other and from the perimeter of the recessed region.

7. The method as recited in claim 6, wherein:
   the step of dividing the recessed region includes forming a second set of ribs in the recessed region such that each rib of the second set of ribs extends from a respective rib of the first set of ribs; and
   wherein the positioning step includes situating one or more of the plurality of cover skins over the second set of ribs such that the second set of ribs are spaced apart from the plurality of cover skins.

8. The method as recited in claim 6, wherein the step of dividing the cover occurs such that the plurality of localized cover skins exclude the perimeter of the cover.

9. The method as recited in claim 8, further comprising:
   forming the main body; and
   wherein positioning step occurs such that the external surface contour of the main body and external surfaces of the plurality of cover skins cooperate to define a pressure side or a suction side of an airfoil.

10. The method as recited in claim 9, wherein the airfoil is a fan blade.

11. The method as recited in claim 6, wherein:
    the step of dividing the covers occurs such that the plurality of localized cover skins includes a first cover skin having a plurality of branch segments extending from an elongated body;
    the step of dividing the recessed region includes forming a first rib of the one or more ribs; and
    the positioning step occurs such that the first rib follows a perimeter of the first cover skin along each of the plurality of branch segments and along the elongated body.

12. The method as recited in claim 1, further comprising:
    forming the main body to establish a portion of an airfoil;
    wherein the airfoil includes an airfoil body extending between leading and trailing edges in a chordwise direction and extending from a root section in a spanwise direction, the airfoil body comprises the main body, and the airfoil body defines pressure and suction sides separated in a thickness direction; and
    wherein the positioning step occurs such that the external surface contour of the main body and external surfaces of the plurality of cover skins cooperate to define the pressure side or the suction side of the airfoil.

13. The method as recited in claim 12, wherein the airfoil is a fan blade.

* * * * *